(12) United States Patent
Finnell

(10) Patent No.: US 9,164,741 B2
(45) Date of Patent: Oct. 20, 2015

(54) ENHANCED DESIGN GUIDES

(75) Inventor: Andrew Finnell, Plano, TX (US)

(73) Assignee: Adobe Systems Incorporated, San Jose, CA (US)

( * ) Notice: Subject to any disclaimer, the term of this patent is extended or adjusted under 35 U.S.C. 154(b) by 3184 days.

(21) Appl. No.: 11/192,987

(22) Filed: Jul. 29, 2005

(65) Prior Publication Data

US 2014/0304627 A1    Oct. 9, 2014

(51) Int. Cl.
*G06F 9/44* (2006.01)

(52) U.S. Cl.
CPC ... *G06F 8/38* (2013.01); *G06F 8/34* (2013.01)

(58) Field of Classification Search
USPC ............... 345/157, 650, 661, 676; 715/856
See application file for complete search history.

(56) References Cited

U.S. PATENT DOCUMENTS

| | | | |
|---|---|---|---|
| 5,845,303 A | 12/1998 | Templeman | |
| 5,886,694 A | 3/1999 | Breinberg et al. | |
| 6,014,127 A * | 1/2000 | Blomqvist | 715/856 |
| 6,377,240 B1 | 4/2002 | Baudel | |
| 6,844,885 B2 * | 1/2005 | Anderson et al. | 345/650 |
| 7,246,311 B2 | 7/2007 | Bargeron et al. | |
| 7,474,328 B2 | 1/2009 | Brunkhardt et al. | |
| 2001/0018644 A1 * | 8/2001 | Schwalb et al. | 703/7 |
| 2005/0055635 A1 | 3/2005 | Bargeron et al. | |
| 2005/0104849 A1 * | 5/2005 | Hoile | 345/157 |
| 2005/0172226 A1 | 8/2005 | Kobashi et al. | |

OTHER PUBLICATIONS

Unpublished U.S. Appl. No. 11/172,423, filed Jun. 30, 2005.
Office Action mailed Sep. 20, 2007 in U.S. Appl. No. 11/172,423.
Final Office Action mailed Feb. 13, 2008 in U.S. Appl. No. 11/172,423.
Office Action mailed Mar. 26, 2008 in U.S. Appl. No. 11/172,423.
Office Action mailed Jul. 11, 2008 in U.S. Appl. No. 11/172,423.
Final Office Action mailed Nov. 5, 2008 in U.S. Appl. No. 11/172,423.
Office Action mailed Apr. 3, 2009 in U.S. Appl. No. 11/172,423.
Interview Summary mailed Sep. 2, 2009 in U.S. Appl. No. 11/172,423.
Final Office Action mailed Jan. 5, 2010 in U.S. Appl. No. 11/172,423.
Advisoy Action mailed Mar. 31, 2010 in U.S. Appl. No. 11/172,423.
Interview Summary mailed May 26, 2010 in U.S. Appl. No. 11/172,423.
Examiner's Answer mailed Jul. 7, 2010 in U.S. Appl. No. 11/172,423.

\* cited by examiner

*Primary Examiner* — William Boddie
*Assistant Examiner* — Leonid Shapiro
(74) *Attorney, Agent, or Firm* — Kilpatrick Townsend & Stockton LLP

(57) ABSTRACT

The present invention is directed to a system and method for providing interface layout information related to one or more interface objects. As the designer places various design guides on the design canvas to assist in spacing and laying out interface objects, the ADE maintains a list of distances between each guide. When the user selects a desired screen area within the design canvas, the ADE displays selected distances for one or more of the design guides associated with the selected screen area.

23 Claims, 4 Drawing Sheets

ENHANCED DESIGN GUIDES

TECHNICAL FIELD

The present invention relates, in general, to application development environments, and, more specifically, to enhanced design guides.

BACKGROUND OF THE INVENTION

In creating graphics-oriented applications, such as Hypertext Markup Language (HTML) Web pages, Rich Internet Applications (RIAs), and the like, designers often obtain graphics files from graphics designers that will be used as templates to generate the application graphics. The graphics designers typically create the graphics files using graphics design and drawing applications, such as MACROMEDIA INC.'s FIREWORKS™ and FREEHAND™, ADOBE SYSTEMS, INC.'s PHOTOSHOP™ and ILLUSTRATOR™, and the like. The application designers generally use application development environments (ADEs), such as MACROMEDIA, INC.'s DREAMWEAVER™ and FLEX BUILDER™, ADOBE SYSTEMS, INC.'s GO LIVE™, MICROSOFT CORPORATION's FRONT PAGE™, and the like, to create the application. The application developers may use the graphics files as templates in creating the application graphics.

In the typical application workflow, the design of the application is often performed visually. For example, in DREAMWEAVER™ and FLEX BUILDER™, the designer may work in a design view mode, in which the designer graphically manipulates screen or interface objects using manual manipulation. More complicated logic functions may be created using a code view mode, in which the designer inputs code, whether HTML code, or other application-compatible code, such as MACROMEDIA INC.'s MXML™, ACTIONSCRIP™, and the like. By combining the graphical design in the design view mode, with the logic-intensive design in the code view, the application designer may create various graphics-related applications.

During design time, the application designer will typically want to match the prepared template graphics as closely as possible. In order to do that, the designer sets design guides onto the design canvas. Design guides are usually just straight lines, either vertical or horizontal, that help designers layout or align various object within the design canvas. Depending on what type of graphic is being used, the designer may have a certain amount of leeway to modify the drawing or relationship in creating the application interface. In other instances, such as when the graphics are logos or other highly-structured items, there may be a standard set of rules that will be strictly followed. In such strict, rules-based designs, the application designer will generally strictly follow each of the rules to create as near of an exact match to the prepared graphics as possible. Therefore, the precise location and positioning of the graphics becomes critical. This strict, rules-based design methodology is, thus, typically one of the more common times that application designers use design guides. However, in creating the design of the application, some of the problems that may arise involve the spacing and size of certain objects on the design canvas. This information is useful in lining up the objects in the proper layout.

Additionally, even without using graphics templates, when a designer is initially creating and placing objects or graphics in a development environment, design guides are typically used to assist in properly spacing and aligning the various objects and graphics.

Depending on the type of application under design, it may also be useful to know the positioning using different units of measure, such as pixels, inches, centimeters, and the like. Additional application types allow reliance on percentages to describe and create the object relationships on the design canvas. A percentage measurement describes the percentage of the available space or canvas where the specific object or design guide is located. Examples of applications that may use percentages are HTML tables, MACROMEDIA INC.'s FLEX™ interface layouts, and the like. Tools exist in current ADE's to assist designers and developers measure the various distances and sizes of the design objects. Such tools typically consist of additional rulers that the designer may select and position across the screen objects. However, such rulers are merely additional user interface (UI) elements for the designer to learn and plot out onto the design canvas. While these existing tools allow the designer/developer to obtain the layout information, the additional time used in manipulating the UI elements adds to the cost of creating the application.

BRIEF SUMMARY OF THE INVENTION

The present invention is directed to a system and method for providing interface layout information related to one or more interface objects. As the designer places various design guides on the design canvas to assist in spacing and laying out interface objects, the ADE measures and/or maintains a list of distances between each guide. When the user selects a desired screen area within the design canvas, the ADE displays selected distances for one or more of the design guides associated with the selected screen area.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
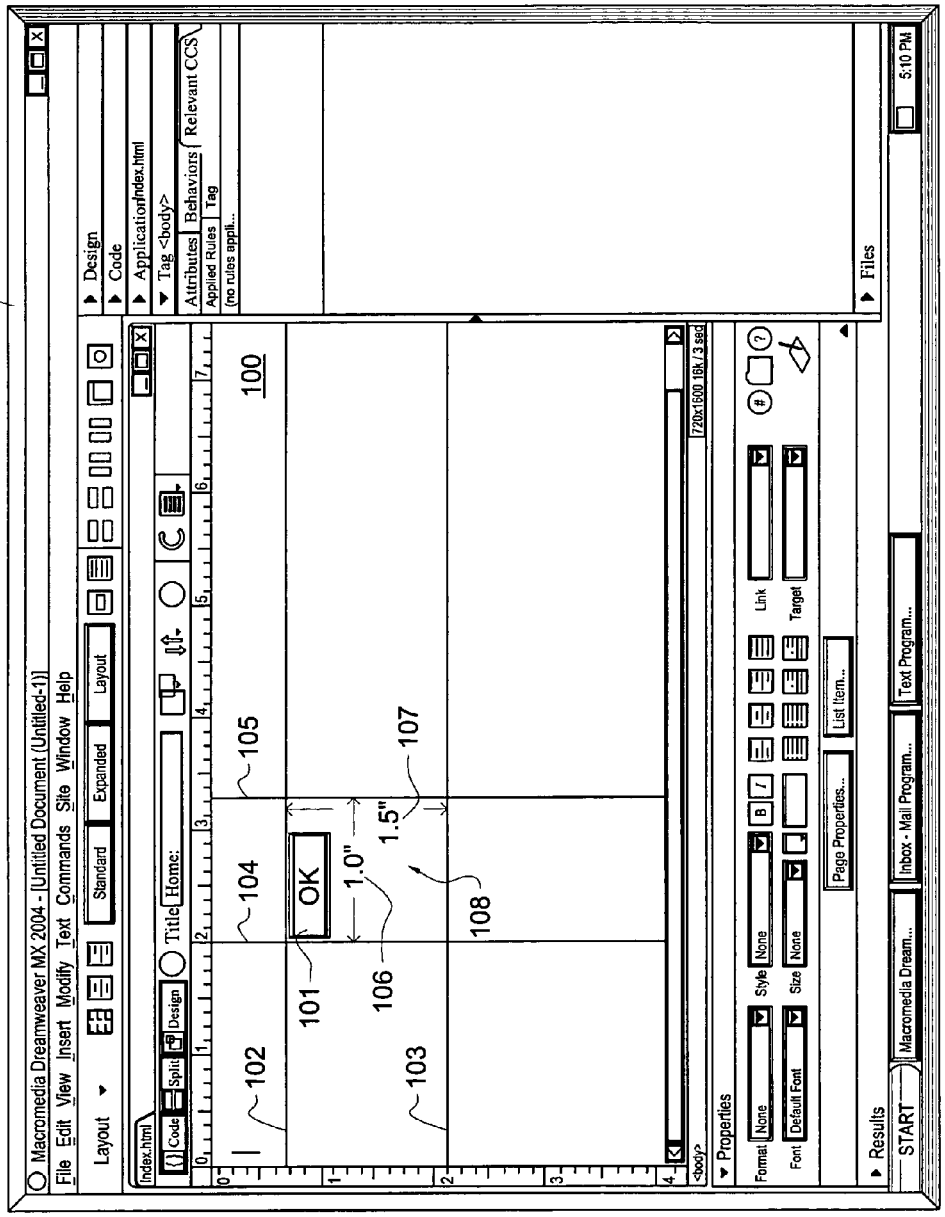
FIG. 1 is a screenshot illustrating an ADE configured according to one embodiment of the present invention.

FIG. 1 is a screenshot illustrating ADE 10 configured according to one embodiment of the present invention. ADE 10 includes design canvas 100 on which a designer/developer places interface objects for use in graphically creating an application. For example, a designer places OK button 101 onto design canvas 100. As the designer continues working on the application, he or she places a number of design guides, design guides 102-105, onto design canvas 100. The designer/developer uses design guides 102-105 to assist in placing the additional interface elements onto design canvas 100 that will eventually become a part of the application interface.

In placing the various interface elements, the designer wishes to know how to space the elements and/or objects in order to meet any design standards or to place the elements/objects in a desired location on the interface. In particular, the designer wishes to know the exact spacing between design guides 102 and 103 and between design guides 104 and 105. To determine these distances, the designer/developer places pointer 108 in a location between the intersection of design guides 102-105. With pointer 108 positioned, the designer selects a modifier key that prompts ADE 10 to display distance measurements 106 and 107. Distance measurement 106 shows the measured distance in inches between vertical design guides 104 and 105. Distance measurement 107 shows the measured distance between horizontal design guides 102 and 103. The designer may then toggle distance measurements 106 and 107 on and off by de-selecting the modifier key.

It should be noted that in various embodiments of the present invention, different methods may be used to turn the distance measurement presentations on and off of the display. In addition to the modifier key described above, alternative embodiments of the present invention may use hovering or a right-click on a mouse or other such pointing device, or a left-click to activate display of selected distances.

It should be noted that in additional and/or alternative embodiments of the present invention, the ADE may include additional features that allow the user to bind a design guide, such as design guide 102, to a screen object, such as OK button 101. By binding the two elements, every time the user or designer moves OK button 101, design guide 102 will move along with it, in a relative position. As a part of this motion, the ADE will recalculate any of the distances that are related to design guide 102.

Figure 2:
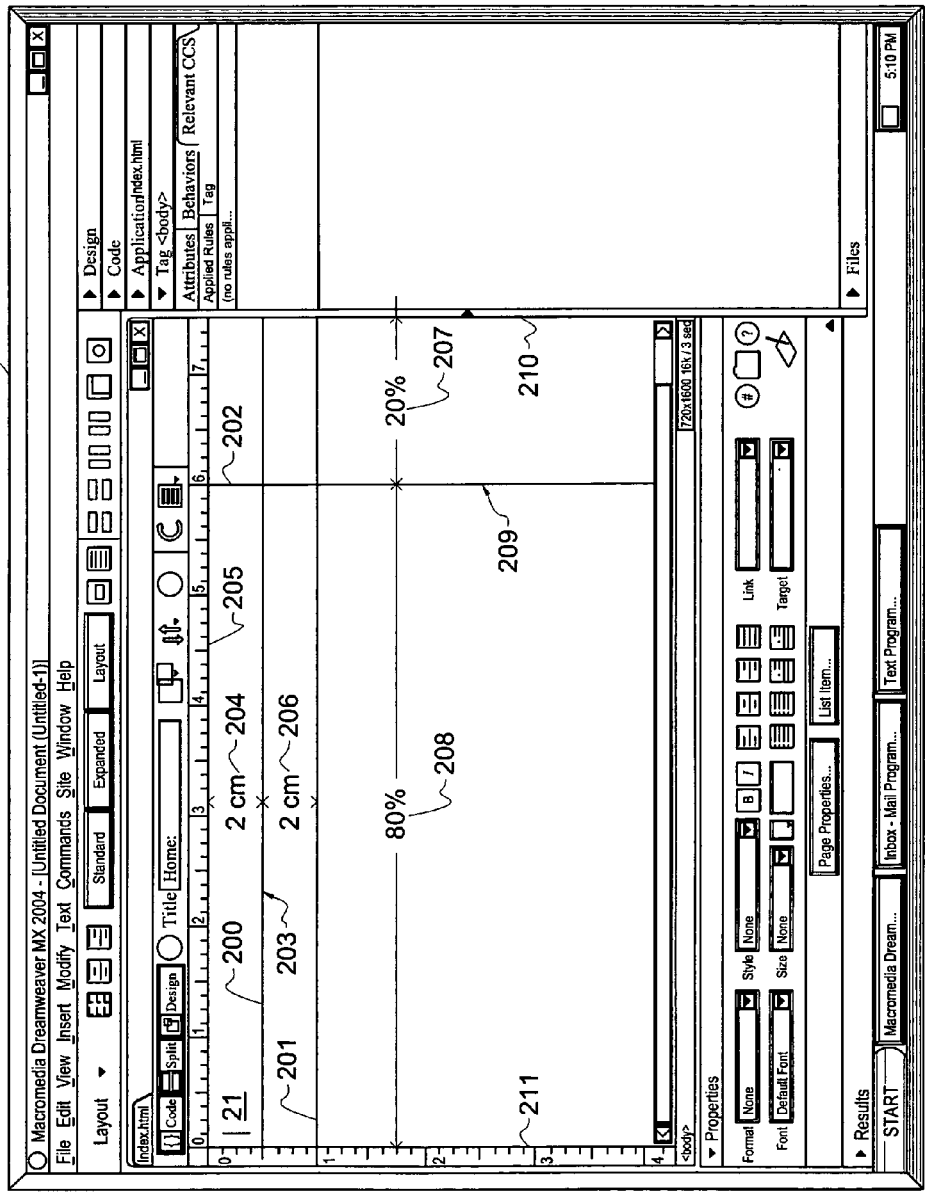
FIG. 2 is a screenshot illustrating an ADE configured according to another embodiment of the present invention.

FIG. 2 is a screenshot illustrating ADE 20 configured according to another embodiment of the present invention. In ADE 20, the designer places design guides 200-202 onto design canvas 21. In the present embodiment, the designer positions pointer 203 over design guide 200 and selects the measurement display feature trigger. In response, ADE 20 renders layout measurement 204, which displays the distance between design guide 200 and edge 205, and layout measurement 206, which displays the distance in centimeters between design guide 200 and design guide 201. Thus, by activating the measurement display feature while pointer 203 is pointing to design guide 200, ADE 20 displays the distances between design guide 200 and the closest two edge objects, whether the edge objects are other design guides or the edge of the design canvas.

The measurement display feature also may be used to view distances in percentages. Percentages are generally used in HTML pages, for spacing/sizing tables, and in RIAs that may have interfaces that re-size according to the client's display size. For example, by placing pointer 209 onto design guide 202 and selecting a modifier key or opening a measurement properties dialog (Not Shown), the designer may select for all measurements associated with design guide 202 to be displayed in percentages. With pointer 209 still pointing to design guide 202, the designer is able to instruct ADE 20 to display percentage measurement 207, between design guide 202 and canvas edge 210, and percentage measurement 208, between design guide 202 and canvas edge 211, by activating the measurement display feature trigger. In further operation, if the designer were to re-size design canvas 21, percentage measurements 207 and 208 may change to reflect any change in positioning percentage.

It should be noted that in additional and/or alternative embodiments of the present invention, if the designer were to re-size design canvas 21, design guide 202 would change positions to maintain the original percentages measured by ADE 20.

It should further be noted that in additional and/or alternative embodiments of the present invention, an ADE may include additional features that allow a user or designer to bind design guides, such as design guide 200 and 201 together. By binding design guide 200 and 201 together, they become associated with the distance between them staying constant regardless of where the designer would move one or the other. When the designer moves design guide 201, guide 200 would move in relation thereto. And, any measurements that are related to either of design guides 200 and/or 201 would be recalculated.

Figure 3:
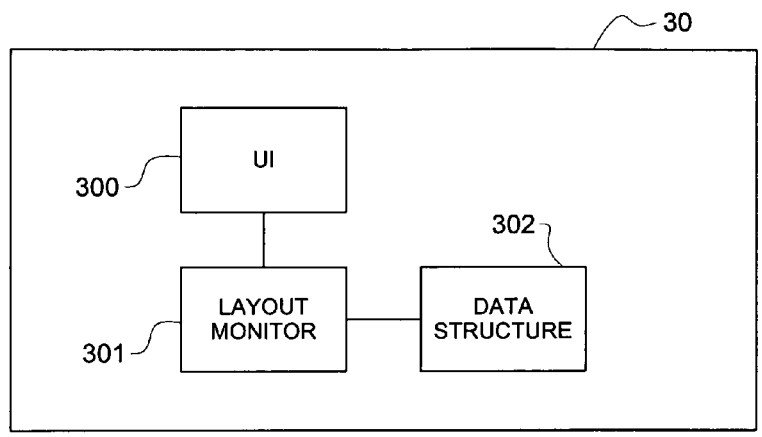
FIG. 3 is a block diagram illustrating an ADE configured according to one embodiment of the present invention.

FIG. 3 is a block diagram illustrating ADE 30 configured according to one embodiment of the present invention. ADE 30 includes UI 300, which controls the rendering of the UI elements to the designer on a design canvas of ADE 30. Layout monitor 301 of ADE 30 monitors the graphical renderings on UI 300 during its operation. As the designer places design guides onto the design canvas, layout monitor 301 notes the location or coordinates of the design guides and saves this information in data structure 302. When the designer selects to activate the measurement feature, ADE 30 accesses data structure 302 to obtain the location/coordinates of the design guides that are associated with the selection point made by the designer. ADE 30 then calculates the distance between the location/coordinates of each of the design guides selected for measurement. Depending on the units of measurement selected by the designer, ADE 30 will convert the calculated measurement into the units of choice. The calculation is then rendered onto the display by UI 300 in the location of the selected design guides.

It should be noted that in additional and/or alternative embodiments of the present invention, a measurement module within layout monitor 301 may calculate the relative distances between each of the design guides and canvas edges the designer places each design guide. These distances may then be stored in data structure 302 in relation to the various design guides. In such embodiments, when the designer activates the measurement feature, ADE 30 uses the selected design guides to locate the relevant distances that are stored in data structure 302. Those distances are then used by UI 300 to render the number or percentage onto the display.

Figure 4:
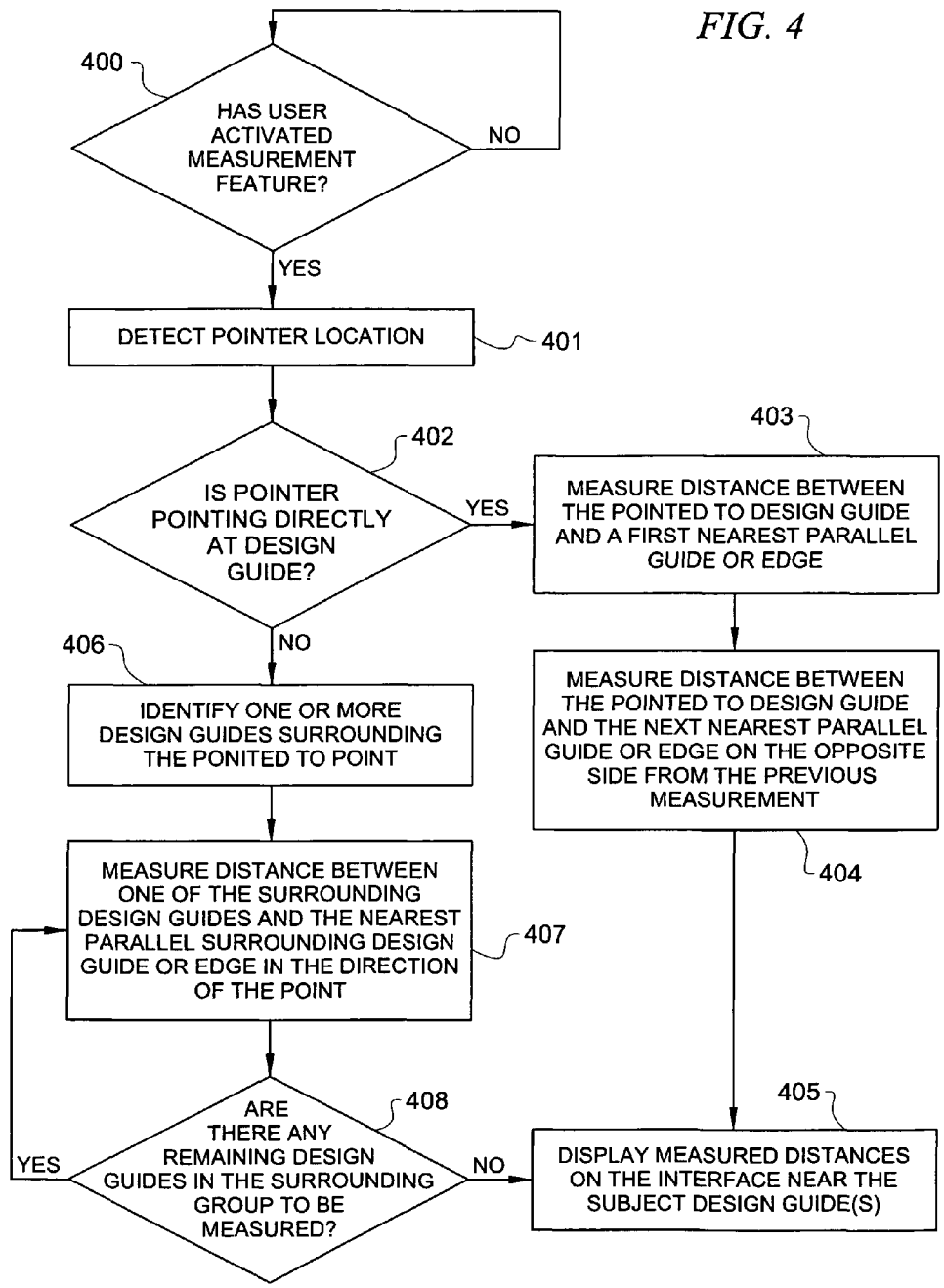
FIG. 4 is a flowchart illustrating example steps executed in implementing one embodiment of the present invention.

FIG. 4 is a flowchart illustrating example steps executed in implementing one embodiment of the present invention. In step 400, a determination is made whether the user has activated the measurement feature of the ADE. If not, the system continues to wait and monitor for the activation signal. If the user has activated the measurement feature, the location of the pointer is detected in step 401. A determination is made, in step 402, whether the pointer is pointing directly at a design guide on the design canvas. If so, then, in step 403, the distance is measured between the design guide being pointed to and a first of the nearest parallel design guides or canvas edges. In step 404, the distance is then measured to a second of the nearest parallel design guides or canvas edges on the opposite side of the first nearest one. Once the two measurements from the design guide being pointed to have been measured, the distances are displayed, in step 405, on the design canvas near the design guide being pointed to.

If, in response to the determination from step 402, the pointer is not pointing directly to a design guide, all of the design guides that surround the point are identified in step 406. Beginning with a first of the surrounding design guides, the distance is measured between that design guide and the nearest parallel design guide in the group of surrounding design guides or the canvas edge in step 407. The nearest design guide or edge selected in step 407 will be nearest in the direction of the point. In step 408, a determination is made whether any additional design guides are left in the group of surrounding design guides to be measured. If so, then step 407 is repeated with the next surrounding design guide. If not, then each of the measured distances is displayed on the interface near its respective design guide(s).

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 5:
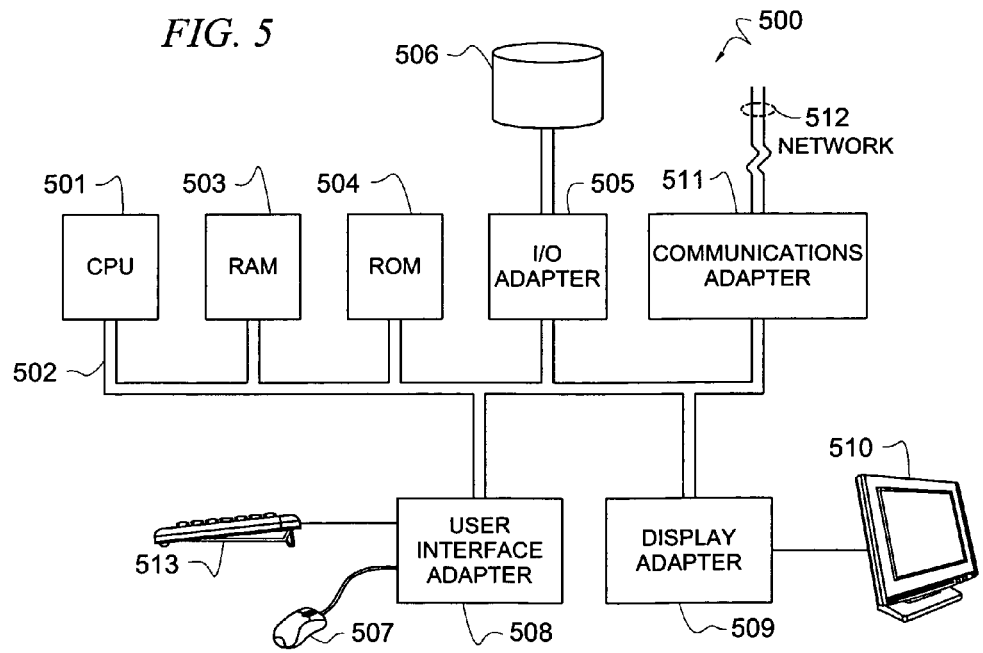
FIG. 5 illustrates a computer system adapted to use embodiments of the present invention.

FIG. 5 illustrates computer system 500 adapted to use embodiments of the present invention, e.g. storing and/or executing software associated with the embodiments. Central processing unit (CPU) 501 is coupled to system bus 502. The CPU 501 may be any general purpose CPU. However, embodiments of the present invention are not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects storage devices 506, such as one or more of a hard drive, a CD drive, a floppy disk drive, a tape drive, to computer system 500. The I/O adapter 505 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507, and the like, to the computer system 500. The display card 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for viewing one or more distances relative to one or more design guides on a design interface, said method comprising:

providing, by a computing system comprising a processor, a design interface;

displaying, by the computing system, a plurality of design guides on the design interface, each design guide comprising a line extending across the design interface;

detecting, by the computing system, a location of a pointer on said design interface;

identifying, by the computing system, at least one of the displayed design guides based on said location of the pointer;

measuring, by the computing system, a distance between said identified at least one of the displayed design guides and at least one of an edge of said design interface or a second design guide displayed in the design interface;

displaying said measured distance on said design interface; and responsive to receiving an input command, binding a first of said plurality of design guides to at least one other of the plurality of design guides, wherein movement of said bound design guide moves said at least one other of the plurality of design guides; and again determining said distance responsive to said movement.

2. The method of claim 1 further comprising:

monitoring said design interface for placement of said one or more design guides;

responsive to said monitoring, identifying a set of coordinates for each of said one or more design guides.

3. The method of claim 2 further comprising:

storing said set of coordinates in a memory.

4. The method of claim 3 wherein measuring the distance comprises:

measuring said distance using said stored set of coordinates corresponding to said identified at least one displayed design guide.

5. The method of claim 1 wherein said displaying is responsive to an input signal.

6. The method of claim 1 wherein said one or more distances are displayed in units specified in an input command.

7. The method of claim 6 wherein said units comprise one or more of:
- metric units;
- English units;
- pixels; and
- percentages.

8. A method for viewing one or more distances relative to one or more design guides on a design interface, said method comprising:
- providing, by a computing system comprising a processor, a design interface;
- displaying, by the computing system, a plurality of design guides on the design interface, each design guide comprising a line extending across the design interface;
- detecting, by the computing system, a location of a pointer on said design interface;
- identifying, by the computing system, at least one of the displayed design guides based on said location of the pointer;
- measuring, by the computing system, a distance between said identified at least one of the displayed design guide displayed in the design interface;
- displaying said measured distance on said design interface; and
- responsive to receiving an input selection, binding one of said one or more design guides to a selected interface object on said design canvas, wherein movement of said selected interface object moves said bound one of said one or more design guides; and
- re-measuring said one or more distances responsive to said movement.

9. A method for viewing one or more distances relative to one or more design guides on a design interface, said method comprising:
- providing, by a computing system comprising a processor, a design interface;
- displaying, by the computing system, a plurality of design guides on the design interface, each design guide comprising a line extending across the design interface;
- detecting, by the computing system, a location of a pointer on said design interface;
- identifying, by the computing system, at least one of the displayed design guides based on said location of the pointer;
- measuring, by the computing system, a distance between said identified at least one of the displayed design guides and a least one of an edge of said design interface or a second design guide displayed in the design interface, wherein said distance comprises a percentage and wherein positioning of said plurality of design guides changes according to a size of said design interface to maintain said one or more percentages; and
- displaying said measured distance on said design interface.

10. A method for displaying distance between one or more design guides on a design interface, said method comprising:
- providing, by a computing system comprising a processor, a design interface;
- displaying, by the computing system, at least one design guide on the design interface, each design guide comprising a line extending across the design interface;
- detecting a pointer position on said design interface;
- receiving, by the computing system, an input command and, in response, selecting a design guide associated with said pointer position for measurement; and
- measuring a distance between the selected design guide and an edge of said design interface;
- displaying said distance;
- responsive to receiving a selection input, binding a first design guide to at least one other design guide, wherein movement of one bound design guide moves the at least one other design guide; and
- re-measuring said distance responsive to said movement.

11. The method of claim 10 further comprising:
- storing a set of coordinates for each of said at least one design guide, wherein said measuring uses said set of coordinates.

12. The method of claim 10, further comprising receiving a selection of units for use in displaying said distance.

13. The method of claim 12 wherein said units comprise one or more of:
- metric units;
- English units;
- pixels; and
- percentages.

14. A method for displaying distance between one or more design guides on a design interface, said method comprising:
- providing, by a computing system comprising a processor, a design interface;
- displaying, by the computing system, design interface, each design guide comprising a line extending across the design interface;
- detecting a pointer position on said design interface;
- receiving, by the computing system, an input command and, in response, selecting a design guide associated with said pointer position for measurement; and
- measuring a distance between the selected design guide and an edge of said design interface;
- displaying said distance;
- responsive to receiving a selection input, binding at least one design guide to a selected interface object on said design canvas, wherein movement of said selected interface object moves said bound at least one design guide; and
- re-measuring said distance responsive to said movement.

15. A method for displaying distance between one or more design guides on a design interface, said method comprising:
- providing, by a computing system comprising a processor, a design interface;
- displaying, by the computing system, at least one design guide on the design interface, each design guide comprising a line extending across the design interface;
- detecting a pointer position on said design interface;
- receiving, by the computing system, an input command and, in response, selecting a design guide associated with said pointer position for measurement;
- measuring a distance between the selected design guide and an edge of said design interface; wherein said distance comprise a percentage, and wherein positioning of said at least one design guide changes according to a size of said design interface to maintain said percentage; and
- displaying said distance.

16. A computer program product having a non-transitory computer readable medium embodying computer program code that configures a computing system to indicate one or more distances relative to one or more design guides on a design interface, said computer program product comprising:
- code that configures the computing system to provide a design interface;

code that configures the computing system to display at least one design guide on the design interface;

code that configures the computing system to detect a location of a pointer on said design interface;

code that configures the computing system to determine at least one design guide corresponding to said location;

code that configures the computing system to measure at least one distance, the at least one distance comprising a distance measured between the determined at least one design guide and an edge of the design interface or a distance measured between the determined at least one design guide and another design guide displayed on said design interface; and code that configures the computing system to display the measured at least one distance. and code that configures the computing system to change a positioning of said at least one design guide in response to a command changing a to a size of said design interface so that the positioning of said at least one design guide is maintained relative to an edge of the design interface or relative to another design guide.

17. The computer program product of claim 16 further comprising: code that configures the computing system to monitor said design interface for placement of said plurality of design guides; and code that configures the computing system to, in response to monitoring, identify a set of coordinates for each of said plurality of design guides.

18. The computer program product of claim 17 further comprising: code that configures the computing system to store said set of coordinates in a memory.

19. The computer program product of claim 18, wherein said code that configures the computing system to measure at least one distance uses said stored set of coordinates.

20. The computer program product of claim 16 wherein said code that configures the computing system to display is executable responsive to an input command.

21. The computer program product of claim 16 wherein said one or more distances are displayed in units specified in an input command.

22. The computer program product of claim 21 wherein said units comprise one or more of: metric units; English units; pixels; and percentages.

23. The computer program product of claim 16 further comprising:

code that configures the computing system to update said displayed at least one distance responsive to movement of the determined design guide or movement of another design guide.

\* \* \* \* \*